(12) United States Patent
Bailey et al.

(10) Patent No.: US 8,618,913 B1
(45) Date of Patent: Dec. 31, 2013

(54) RADIO FREQUENCY IDENTIFICATION ENABLED MOBILE DEVICE

(75) Inventors: Daniel V. Bailey, Pepperell, MA (US); John Brainard, Sudbury, MA (US); Ari Juels, Brookline, MA (US); Kevin D. Bowers, Melrose, MA (US)

(73) Assignee: EMC Corporation, Hopkinton, MA (US)

( * ) Notice: Subject to any disclaimer, the term of this patent is extended or adjusted under 35 U.S.C. 154(b) by 368 days.

(21) Appl. No.: 12/907,625

(22) Filed: Oct. 19, 2010

Related U.S. Application Data

(60) Provisional application No. 61/252,870, filed on Oct. 19, 2009.

(51) Int. Cl.
*H04Q 5/22* (2006.01)

(52) U.S. Cl.
USPC ........................................................ 340/10.1

(58) Field of Classification Search
USPC ............. 340/10.1, 5.61, 12.5; 342/450, 414.2
See application file for complete search history.

(56) References Cited

U.S. PATENT DOCUMENTS

| | | | | |
|---|---|---|---|---|
| 7,562,813 B2 * | 7/2009 | Humphrey et al. | ............ | 235/379 |
| 7,597,250 B2 * | 10/2009 | Finn | ............................... | 235/380 |
| 7,920,047 B2 * | 4/2011 | Bates | ............................ | 340/5.61 |
| 2003/0184474 A1 * | 10/2003 | Bajikar | ......................... | 342/450 |
| 2006/0197653 A1 * | 9/2006 | Kung et al. | ................. | 340/10.34 |
| 2009/0006230 A1 * | 1/2009 | Lyda et al. | ....................... | 705/35 |

OTHER PUBLICATIONS

Czeskis et al., "RFIDs and Secret Handshakes: Defending Against Ghost-and-Leech Attacks and Unauthorized Reads with Context-Aware Communications," 15th ACM Conference on Computer and Communications Security, Oct. 27-31, 2008.
Heydt-Benjamin et al., "Vulnerabilities in First-Generation RFIC-Enabled Credit Cards," draft, Proceedings of Eleventh International Conference on Financial Cryptography and data Security, Lowlands, Scarborough, Trinidad/Tabago, Feb. 2007.

* cited by examiner

*Primary Examiner* — Vernal Brown
(74) *Attorney, Agent, or Firm* — BainwoodHuang

(57) ABSTRACT

An RFID enabled mobile device is configured to provide a secure release of RFID information. The RFID enabled mobile device, such as an RFID enabled cellular telephone, includes a set of sensors, such as a camera, one or more accelerometers, a wireless transceiver configured to send and receive data with an Internet device, and a global positioning system (GPS) receiver. The RFID enabled mobile device utilizes sensor attributes or information from one or more sensor of the set of sensors and, based upon the sensor attributes, controls the release of RFID information and/or other authentication data to an RFID interrogation system. In essence, the RFID enabled mobile device leverages from the conventional sensors typically incorporated as part of the mobile device and uses contextual data from its sensors and communication partners to make security decisions regarding the release of RFID information.

18 Claims, 3 Drawing Sheets

RADIO FREQUENCY IDENTIFICATION ENABLED MOBILE DEVICE

CROSS REFERENCE TO RELATED APPLICATIONS

This Patent Application claims priority to U.S. Provisional Patent Application No. 61/252,870 filed on Oct. 19, 2010, entitled, "RADIO FREQUENCY IDENTIFICATION ENABLED MOBILE DEVICE," the contents and teachings of which are hereby incorporated by reference in their entirety.

BACKGROUND

In general, radio frequency identification (RFID) involves an exchange of radio frequency (RF) signals between an RFID interrogation system and a mobile RFID device for identification and/or tracking purposes. The RFID interrogation system typically includes a transceiver, which is commonly called an RFID reader, and a controller. When the mobile RFID device, such as an RFID card, moves within range of the RFID reader, the RFID card receives power in a wireless manner from the RFID reader. As the RFID card receives this power, the controller is able to write data to and read data from the RFID card through the RFID reader.

Certain personal wireless devices, such as mobile or cellular telephone devices, can be configured to operate as an RFID card or an RFID reader. Using technologies like Near-Field Communication, mobile device that includes additional radio frequency identification components can operate as both a mobile RFID device and an RFID reader. Typically, an ordinary RFID card or RFID reader cannot determine if a session was conducted with an ordinary card/reader or if it was replaced by an RFID enabled mobile device. Therefore, because the RFID enabled mobile device can emulate the radio emissions of a conventional RFID card or RFID reader, the RFID enabled mobile device can take the place of an RFID building-access card or RFID payment device (i.e., contactless credit card), thereby eliminating the need for a user to carry a separate RFID card altogether.

SUMMARY

Conventional RFID enabled mobile devices suffer from a variety of deficiencies. While RFID enabled mobile devices allow a user to emulate an RFID building-access card or RFID payment device, RFID enabled mobile devices, like conventional RFID cards, are vulnerable to a simple form of identity theft called skimming. Designs for low-cost skimming devices are freely available on the Internet. Furthermore, mobile devices such as cellular phones have a natural resale value, making them an appealing target for theft. If an RFID enabled mobile device were to become stolen, the thief could access the RFID functionality of the mobile device to emulate the user's RFID building-access card or RFID payment device. For example, legacy RFID card systems generally offer very little security because of their severe cost constraints. Most often, RFID building-access cards merely emit a static identifier whenever queried. Accordingly, because of the relatively lax security, the thief of an RFID enabled mobile device could access a legacy RFID card system using the stolen RFID enabled mobile device.

By contrast to conventional RFID enabled mobile devices, embodiments of the present invention relate to an RFID enabled mobile device configured to provide a secure release of RFID information. The RFID enabled mobile device, such as an RFID enabled cellular telephone, includes a set of sensors, such as a camera, one or more accelerometers, a wireless transceiver configured to send and receive data with an Internet device, and a global positioning system (GPS) receiver. The RFID enabled mobile device utilizes sensor attributes or information from one or more sensor of the set of sensors and, based upon the sensor attributes, controls the release of RFID information and/or other authentication data to an RFID interrogation system. In essence, the RFID enabled mobile device leverages from the conventional sensors typically incorporated as part of the mobile device and uses contextual data from its sensors and communication partners to make security decisions regarding the release of RFID information. Accordingly, such an RFID enabled mobile device minimizes the possibility of identity theft and operates with the existing RFID interrogation system infrastructure.

In one arrangement, a radio frequency identification (RFID) enabled mobile device includes a controller and a set of mobile device sensors disposed in electrical communication with the controller. The controller is configured (i) to receive sensor attributes from one or more of the sensors and (ii) based upon the received sensor attributes one of provide or disallow the release of RFID information to an RFID interrogation system.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention relate to an RFID enabled mobile device configured to provide a secure release of RFID information. The RFID enabled mobile device, such as an RFID enabled cellular telephone, includes a set of sensors, such as a camera, one or more accelerometers, a wireless transceiver configured to send and receive data with an Internet device, and a global positioning system (GPS) receiver. The RFID enabled mobile device utilizes sensor attributes or information from one or more sensor of the set of sensors and, based upon the sensor attributes, controls the release of RFID information and/or other authentication data to an RFID interrogation system. In essence, the RFID enabled mobile device leverages from the conventional sensors typically incorporated as part of the mobile device and uses contextual data from its sensors and communication partners to make security decisions regarding the release of RFID information. Accordingly, such an RFID enabled mobile device minimizes the possibility of identity theft and operates with the existing RFID interrogation system infrastructure.

Figure 1:
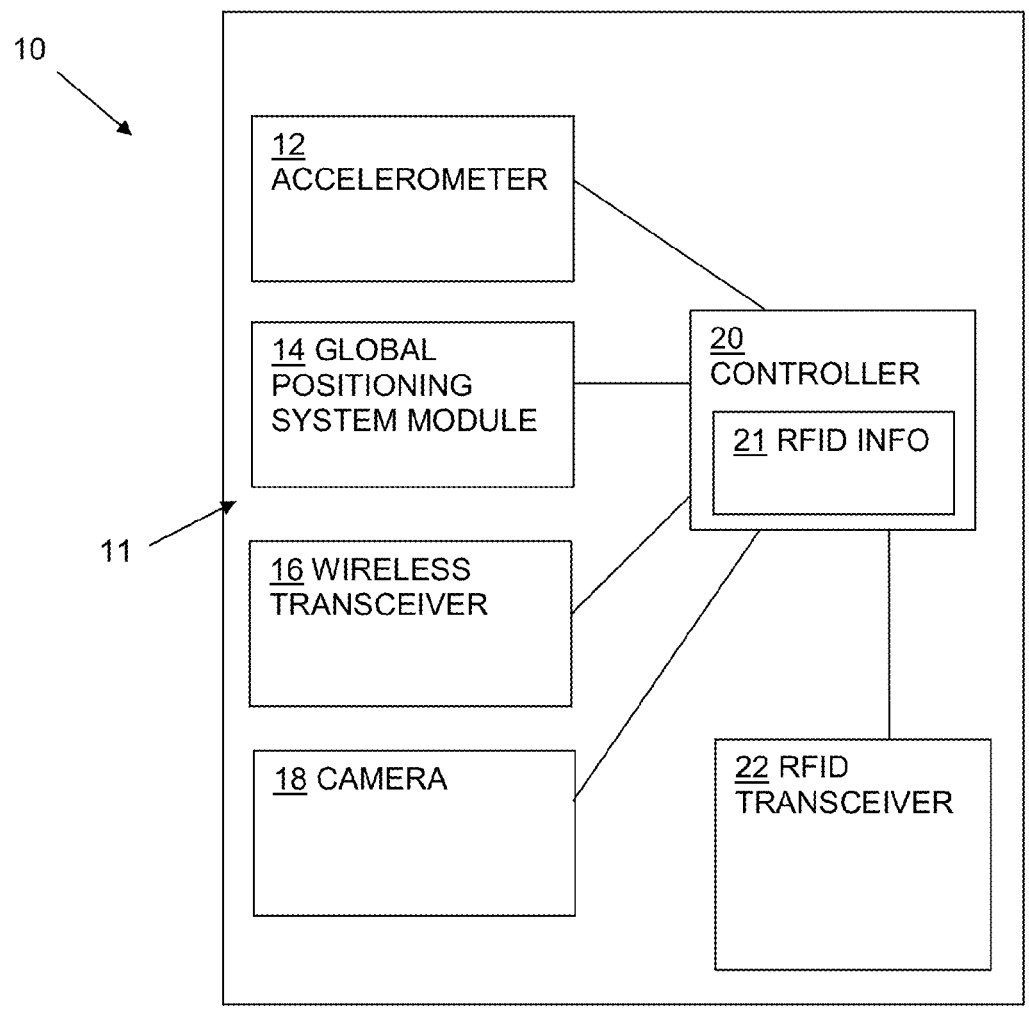
FIG. 1 illustrates a schematic diagram of an RFID enabled mobile device configured to provide a secure release of RFID information.

FIG. 1 illustrates a schematic diagram of an RFID enabled mobile device 10, such as a cellular telephone, according to one arrangement. The RFID enabled mobile device 10 (hereinafter mobile device 10) includes a controller 20, such as a processor and memory, disposed in electrical communication with a set of mobile device sensors 11. While the set of sensors 11 can include a variety of types of sensors, in one arrangement, the set of sensors 11 includes one or more accelerometers 12 configured to respond to user induced motion of the mobile device, such as tilting the phone from side to side, a global positioning system (GPS) module 14, a wireless transceiver 16 configured to exchange signals or data with an Internet device such as a server, and a camera 18. As will be described below, the controller 20 is configured to receive sensor attributes or information from one or more of the sensors. Based upon the received sensor attributes, the controller 20 is configured to provide or disallow the release of RFID information 21, via an RFID transceiver 22, to an RFID interrogation system 30, as illustrated in FIG. 2.

In one arrangement, the controller 20 either provides or disallows the release of RFID information 21 based upon geographic location information provided by the GPS module 14. As indicated in FIG. 2, the GPS module 14 of the mobile device 10 is configured to receive global positioning information (e.g., global coordinate information) from a GPS satellite 32, for example. The GPS module 14 provides the global positioning information to the controller 20 which in turn, utilizes the global positioning information to control the release of RFID information 21 when the mobile device 10 interacts with the RFID interrogation system 30. For example, in one arrangement, after receiving the global positioning information from the GPS module 16, the controller 20 compares the received information with a set of rules relating to the release of RFID information 21 based upon geographic location. In the case where the controller 20 detects that, based upon the received global positioning information, the mobile device 10 is located in a geographic area with a high incidence of user-identity fraud, the controller 20 follows the preset rules and disallows release of the RFID information 21 to the RFID interrogation system 30.

Figure 2:
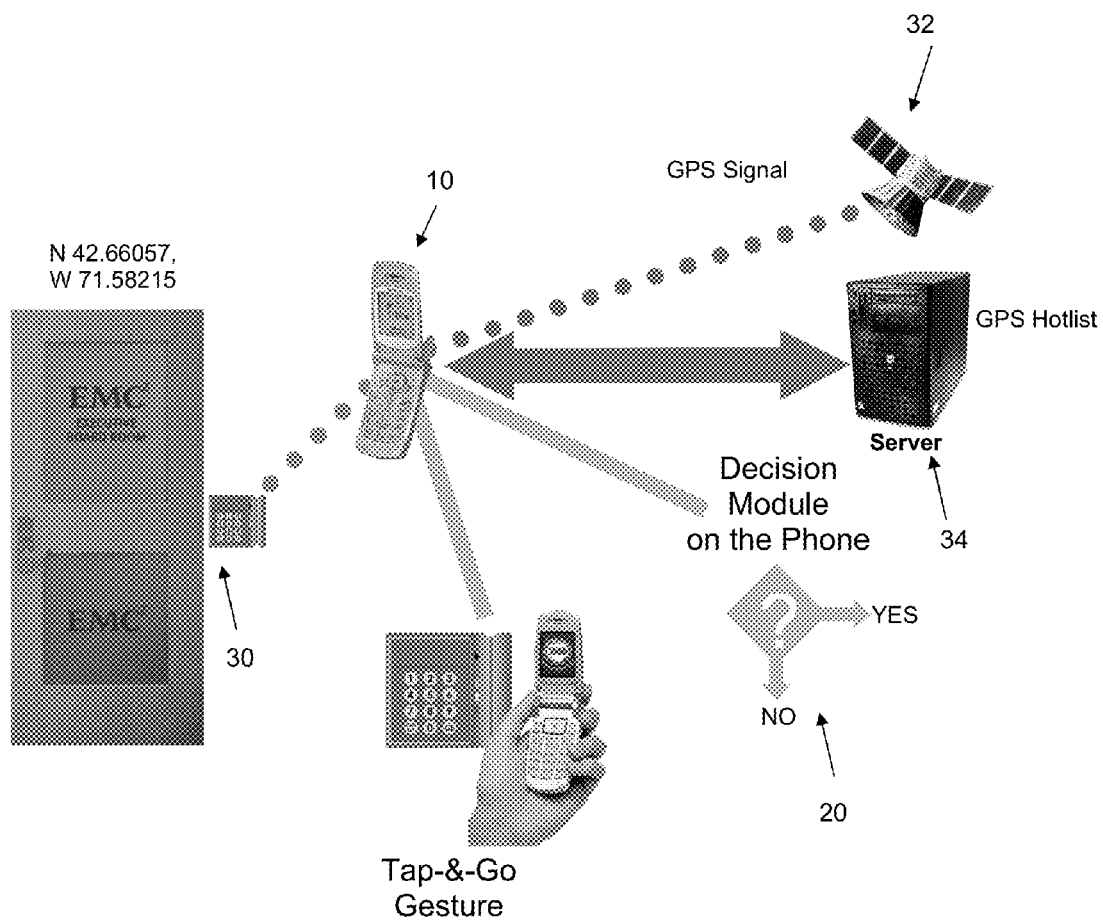
FIG. 2 illustrates an RFID interrogation system having the RFID enabled mobile device of FIG. 1.

In one arrangement, an external device, such as a server device 34, as illustrated in FIG. 2, centrally manages the rules or policies relating to the release of RFID information 21 based upon geographic location. For example, the server device 34 can maintain a repository of known geographic areas with a high incidence of user-identity fraud (i.e., trouble spots) in a "physical-phishing hotlist" and update the rules or policies stored by the mobile device 10 periodically as geographic areas are added or deleted from the repository. Accordingly, when a user travels into a geographic area with a high incidence of user-identity fraud, such as a particular country or province within a country based upon the information provided by the server device 34, the mobile device 10 can disallow release of the RFID information 21 to an RFID interrogation system 30 (i.e., without first authenticating the user in some other manner). Additionally, when the user travels into a geographic area with a low incidence of user-identity fraud, based upon the information provided by the server device 34, the mobile device 10 can allow release of the RFID information 21 to the RFID interrogation system 30

In one arrangement, the controller 20 either provides or disallows the release of RFID information 21 based upon information received from the server device 34 via the wireless transceiver 16. In this arrangement, over time, the mobile device 10 transmits usage data to the server device 34 via the wireless transceiver 16. For example, the usage data can pertain to the location of the mobile device 10 during particular times of the day or to particular amounts of money authorized by the mobile device 10 during these particular timeframes. The server device 34 accumulates the usage data to detect particular usage patterns, termed pattern information, associated with the mobile device 10 (e.g., that the mobile device 10 tend to visit the same places, such as work and home, around the same times of day). When the controller 20 of the mobile device 10 receives a request to release RFID information 21 to an RFID interrogation system 30, the controller 10 retrieves the pattern information from the server device 34 and utilizes the pattern information to establish a risk score associated with the request to release RFID information. Based upon the risk score, the controller 20 can either allow or deny the request.

For example, assume the case where the controller 20 retrieves pattern information from the server device 34 that indicates the mobile device's user travels in a fairly narrow geographic area and authorizes payments of small sums of money with the mobile device 10. In the case where the controller 20 receives a request to release RFID information, such as credit card information, relating to the payment of small amount of money at a quick-service restaurant frequented by the user, based upon a comparison with the retrieved pattern information, the controller 20 assigns the request a relatively low risk score. Furthermore, based upon a comparison between the relatively low risk score and a threshold risk score, the controller 20 can release the RFID information 21 to an RFID interrogation system 30.

By contrast, in the case where the controller 20 receives a request to release RFID information, such as credit card information, for a large amount of money in a remote country not often visited by the user, based upon a comparison with the retrieved pattern information, the controller 20 assigns the request a relatively high risk score. Such a relatively high score can suggest that fraud is about to take place. Furthermore, based upon a comparison between the relatively high risk score and a threshold risk score, the controller 20 can respond in a variety of ways. In one arrangement based upon a comparison between the relatively high risk score and a threshold risk score, the controller 20 can withhold the RFID information 21 from an RFID interrogation system 30. In one arrangement, the relatively high risk score can cause the mobile device 10 to prompt the user for authentication information, such as a personal identification number (PIN), biometric information, or responses to one or more life questions prior to releasing or withholding the RFID information. While the life questions can be generated in a variety of ways, in one arrangement, the mobile device 10 dynamically generates the life questions as a function of the user's and mobile device's location history (e.g., "Where were you last Friday night at 9 p.m.?") or based upon the typical movement of the user during the day (e.g., "How far is your drive to work?" or "How far is your walk to school?").

In one arrangement, the mobile device 10 (e.g., controller) can augment (i.e., adjust up or down) the risk score base upon adjustment policies stored and managed by the server device 34. For example, because the mobile device 10 includes certain sensors, such as the GPS module 14 and the accelerometer 12, the policies can relate to specific attributes of the mobile device 10. For example, the server device 34 can provide a policy such as "release RFID information 21 (building-access credentials) only when the mobile device is located near a protected doorway taken from this list of protected doorways."

In one arrangement, the controller 20 either provides or disallows the release of RFID information 21 based upon information received from the accelerometer 12 associated with the mobile device 10. For example, assume the user wants to provide RFID information 21 associated with a certain credit card to an RFID interrogation system 30. Further assume that the controller 20 only transmits RFID information 21 for the credit card in response to a particular gesture (e.g., a "V" shaped gesture, a "W" shaped gesture, a "Z" shaped gesture) made by the user with the mobile device 10. Accordingly, as the user moves the mobile device 10 according to a particular shaped gesture, the accelerometer 12 detects the motion and provides the gesture information to the controller 20. Based upon a comparison between the received gesture information and preconfigured gesture attributes stored by the controller 20, the controller 20 can release or disallow release of the RFID information 21 to an RFID interrogation system 30. For example, assume the user moves the mobile device along a "V" shaped gesture pattern in the air. The accelerometer 12 provides an electrical signal representing this pattern to the controller 20 as gesture information. In the case where the received gesture information substantially matches the preconfigured gesture attributes stored (i.e., a "V" shaped gesture) by the controller 20, the controller 20 can release the RFID information 21 to the RFID interrogation system 30.

In one arrangement, the controller 20 combines information or signals received from sensors of the set of sensors 11 or from communication partners associated with the mobile device 10 to release or disallow release of the RFID information 21 to an RFID interrogation system 30. For example, the controller 20 can combine the aforementioned gesture information received from the accelerometer 12 with information received from a camera 18 associated with the mobile device 10. With such a combination, the mobile device 10 can detect that it has been removed from a user's pocket and can detect that it is within proximity of an RFID interrogation system 30, such as a payment terminal. In one arrangement, the payment terminal includes a machine-readable barcode or other mechanism to identify the payment terminal to the mobile device 10. With such identification, the mobile device 10 can distinguish among different types of payment terminals and can provide appropriate RFID information 21 accordingly, such as information specific to a particular payment terminal.

In another example, the controller 20 can be configured to transmit RFID information 21 in response to the mobile device 10 undergoing a particular pattern of motions, such as a signature motion, made by a user. For example, as the user moves the mobile device 10 according to a signature motion, the accelerometer 12 detects the motion and provides the signature motion information to the controller 20. As one person's handwritten signature varies by only a small amount, the person's sequence of gestures should similarly fall into a narrowly-defined pattern. Accordingly, in order to minimize the ability for the controller 20 to distinguish signature motion information from accelerometer information caused by the movement of the mobile device 10 when carried by a user, in on arrangement, the controller 20 applies a biometric scheme to the received signature motion information. Based upon a comparison between the received signature information and preconfigured signature attributes stored by the controller 20, the controller 20 can release or disallow release of the RFID information 21 to an RFID interrogation system 30.

Embodiments of the RFID enabled mobile device 10 provides a level of security to the distribution of RFID information 21 while using hardware typically deployed in conventional mobile devices, such as cellular phones. The RFID enabled mobile device 10 provides security to existing RFID interrogation systems (e.g., legacy card systems) and does not require costly infrastructure upgrades to existing RFID interrogation systems, such as building-access and payment-card systems. The RFID enabled mobile device 10 supports flexible enterprise policies that can be centrally managed, such as by a server 32, with updates automatically forwarded to the mobile units.

Figure 3:
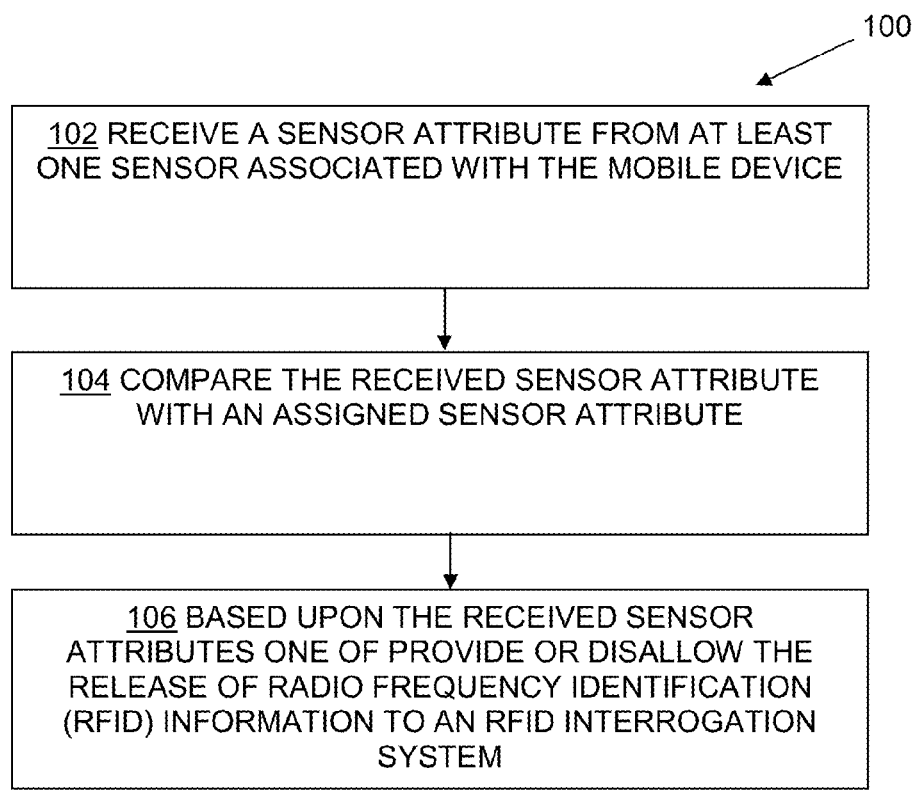
FIG. 3 is a flowchart that illustrates a procedure performed by the controller of the RFID enabled mobile device of FIG. 1.

FIG. 3 is a flowchart 100 that illustrates a procedure performed by the controller 20 of the RFID enabled mobile device of FIG. 1.

In step 102, the controller 20 receives a sensor attribute from at least one sensor 11 associated with the mobile device 10. For example, as described above, the controller 20 can receive the sensor attribute as geographic location information provided by the GPS module 14, as information received from the server device 34 via the wireless transceiver 16, or as spatial position information provided by the accelerometer 12.

In step 104, the controller 20 compares the received sensor attribute with an assigned sensor attribute. For example, the controller 20 can compare received geographic location information with a stored physical-phishing hotlist or can compare received gesture information with preconfigured gesture attributes stored by the controller 20.

In step 106, based upon the results of the comparison, the controller 20 one of provides or disallows release of RFID information to an RFID interrogation system. For example, based upon the comparison, when the received sensor attribute corresponds to the assigned sensor attribute (e.g., the spatial position information or gesture information provided by the accelerometer 12 substantially matches preconfigured gesture attributes stored by the controller 20), the controller 20 can release the RFID information 21 to an RFID interrogation system 30. Otherwise, when the received sensor attribute does not correspond to the assigned sensor attribute (e.g., the spatial position information or gesture information provided by the accelerometer 12 does not substantially match preconfigured gesture attributes stored by the controller 20). the controller 20 can withhold the RFID information 21 to an RFID interrogation system 30.

While various embodiments of the invention have been particularly shown and described, it will be understood by those skilled in the art that various changes in form and details may be made therein without departing from the spirit and scope of the invention as defined by the appended claims.

For example, FIG. 1 illustrates a schematic diagram of an RFID enabled mobile device 10, such as a cellular telephone. Such description is by way of example only. In one arrangement, the mobile device is configured in a variety of ways. For example, in one arrangement, the mobile device 10 is configured as video game controller.

What is claimed is:
1. A radio frequency identification (RFID) enabled mobile device, comprising:
   a controller; and
   a set of mobile device sensors disposed in electrical communication with the controller, the controller being configured (i) to receive sensor attributes from one or more of the sensors and (ii) based upon the received sensor attributes one of provide or disallow the release of RFID information to an RFID interrogation system;
   wherein the set of mobile device sensors includes at least one accelerometer configured to provide the controller with contextual information including at least one of acceleration, tilt angle, motion, and vibration of the mobile device in response to the RFID interrogation, and the controller further allows the release of RFID information based upon the contextual information matching a stored value.

2. The radio frequency identification (RFID) enabled mobile device of claim 1, wherein the set of mobile device sensors includes at least one camera configured to provide the controller with a current image in response to the RFID interrogation system.

3. The radio frequency identification (RFID) enabled mobile device of claim 2, wherein the current image includes facial recognition attributes of a user of the mobile device and the controller allows the release of RFID information based on the facial recognition attributes matching a set of stored values.

4. The radio frequency identification (RFID) enabled mobile device of claim 1, wherein the set of mobile device sensors includes at least one GPS circuit configured to provide the controller with a current location in response to the RFID interrogation system.

5. The radio frequency identification (RFID) enabled mobile device of claim 4, wherein the controller compares the current location to a stored list of known safe locations and the controller allows the release of RFID information based upon the current location matching a known safe location.

6. The radio frequency identification (RFID) enabled mobile device of claim 5, wherein the controller does not allow the release of RFID information based on the current location not matching a known safe location, sends a request for personal identification information to a display device of the mobile device, and allows the release of RFID information if the personal identification information matches a stored value.

7. The radio frequency identification (RFID) enabled mobile device of claim 4, wherein further the controller stores information including at least one of a plurality of past locations and times, frequent mobile device usage locations, and usage patterns over a time period;
the controller calculates a risk value of the current location and time; and
allows the release of RFID information if the risk value is below a stored value.

8. The radio frequency identification (RFID) enabled mobile device of claim 1, wherein the controller is further configured to determine a user identification based upon a stored pattern of mobile device motions including at least one of a tap, a tilt direction, a vertical motion, a horizontal motion, a forward motion, and gestures formed by combinations of motions, and the controller further allows the release of RFID information based upon the user identification matching a stored value.

9. The radio frequency identification (RFID) enabled mobile device of claim 1, wherein the set of mobile device sensors includes a wireless transceiver configured to connect to an internet device configured to provide the controller with a calculated risk score in response to the RFID interrogation system, the risk score based upon risk factors received from a plurality of external sources, and the internet device configured to transmit the calculated risk score to the controller.

10. The radio frequency identification (RFID) enabled mobile device of claim 9, wherein the internet device comprises a server including a memory location storing authentication information and configured to communicate with the controller;
the server configured to transmit a disallowance to the controller to disallow the release of RFID information to an RFID interrogation system when a calculated risk score is greater than a stored value;
the server configured to transmit a request to the controller for authentication information responses based upon the risk score; and
the server being configured to compare the authentication information responses to the memory location storing authentication information, recalculate the risk score when the authentication information matches a stored value, and transmit an allowance to the controller to allow release of RFID information to an RFID interrogation system when the calculated risk score is less than a stored value.

11. The radio frequency identification (RFID) enabled mobile device of claim 10 wherein the stored authentication information includes at least one of a personal identification number (PIN), biometric information, and at least one life question selected from the list including mobile device location at a specified prior time, favorite pet, family names, and employment information.

12. The radio frequency identification (RFID) enabled mobile device of claim 1 wherein the set of mobile device sensors includes:
a global positioning satellite (GPS) circuit coupled to the controller,
an accelerometer circuit coupled to the controller, and
a camera coupled to the controller, and
wherein the controller, when one of providing or disallowing the release of RFID information to the RFID interrogation system based upon the received sensor attributes, is constructed and arranged to:
generate a risk score based on at least some of the sensor attributes including, (i) a geolocation input from the GPS circuit, the geolocation input indicating a current geolocation of the RFID enabled mobile device, (ii) an acceleration input from the accelerometer circuit, the acceleration input indicating an amount of current acceleration of the RFID enabled mobile device, and (iii) a video input from the camera, the video input indicating a current amount of light available to the RFID enabled mobile device,
compare the risk score to a predefined risk threshold, and
output a control signal which releases the RFID information to the RFID interrogation system when the risk score is less than the predefined risk threshold, and prevents release of the RFID information to the REID interrogation system when the risk score is greater than the predefined risk threshold.

13. A method, comprising:
receiving, by a controller associated with a radio frequency identification enabled mobile device, a sensor attribute from at least one sensor associated with the mobile device;
comparing, by the controller, the received sensor attribute with an assigned sensor attribute; and
based upon the received sensor attribute, providing or disallowing, by the controller, the release of radio frequency identification (RFID) information to an RFID interrogation system;
wherein receiving the at least one sensor attribute further includes at least one accelerometer providing the controller with information on the location, acceleration, tilt angle, motion, and vibration of the mobile device, the controller allowing release of RFID information based upon the attributes matching stored value ranges.

14. The method of claim 13, wherein receiving the at least one sensor attribute further includes a camera providing the controller with a current image in response to the RFID interrogation, the current image including at least one of facial recognition attributes of a user of the mobile device and an ambient light level attribute, the controller allowing release of RFID information based upon the attributes matching a stored value range.

15. The method of claim 13, wherein receiving the at least one sensor attribute further includes using the tilt angle, motion, and vibration of the mobile device to determine a user identification based upon comparing the sensor attributes to a stored pattern of mobile device motions including at least one of a tap, a tilt direction, a vertical motion, a horizontal motion, a forward motion, and gestures formed by combinations of mobile device motions, the controller allowing release of RFID information based upon the user identification matching a stored value.

16. The method of claim 13, further including the release of radio frequency identification (RFID) information based upon transmitting the sensor attribute using a wireless transceiver configured to connect to an internet device configured to provide the controller with a calculated risk score based upon risk factors received from a plurality of external sources, wherein the internet device is configured to transmit the calculated risk score to the controller.

17. A mobile device, comprising:
a radio frequency identification (RFID) device;
a controller including memory locations and logic circuits;
a plurality of mobile device sensors;
the controller memory locations and logic circuits configured to receive information from the sensors and calculate a risk of release of RFID information stored in the memory location in response to an RFID interrogation; and
the logic circuits releasing the RFID information when the calculated risk is less than a value stored in the controller memory locations;
further including a wireless transceiver configured to communicate with an internet device configured to store risk factors based upon attributes from at least one of the plurality of mobile device sensors and from a plurality of external risk identification sources;
logic to determine a current risk score for a transaction of the mobile device; and
configured to transmit the current risk score to the controller of the mobile device.

18. The mobile device of claim 17, wherein the plurality of mobile device sensors includes at least one of a camera, an accelerometer, and a global positioning circuit, and sense at least one of biometric information, location, velocity, tilt angle, motion, and vibration attributes of the mobile device;
the sensors configured to transmit the attributes to the controller;
the controller configured to compare the attributes to attribute values stored in the controller memory locations;
the logic circuits configured to release the RFID information in response to the RFID interrogation when the attributes are within a selected range of a value stored in the controller memory locations.

* * * * *